United States Patent [19]

Daugherty et al.

[11] 4,078,150
[45] Mar. 7, 1978

[54] LIQUID-COOLED STUD FOR TERMINAL BUSHINGS OF A GENERATOR

[75] Inventors: Roger H. Daugherty, Wilkinsburg; Roger L. Swensrud, Plum Borough, both of Pa.

[73] Assignee: Westinghouse Electric Corporation, Pittsburgh, Pa.

[21] Appl. No.: 711,335

[22] Filed: Aug. 4, 1976

[51] Int. Cl.² .................... H01B 17/54; H01B 17/26
[52] U.S. Cl. ............................ 174/15 BH; 165/155; 174/12 BH
[58] Field of Search ........... 174/12 BH, 15 BH, 15 C, 174/16 BH; 310/54, 58; 313/22, 24, 30, 32; 338/55; 339/112 R; 165/155

[56] References Cited

U.S. PATENT DOCUMENTS

| | | | |
|---|---|---|---|
| 2,219,613 | 10/1940 | Berghaus et al. | 174/15 BH |
| 2,683,227 | 7/1954 | Beckwith | 174/16 BH X |
| 2,730,337 | 1/1956 | Roswell | 165/155 X |
| 2,742,582 | 4/1956 | Bahn et al. | 174/15 BH X |
| 3,260,872 | 7/1966 | Potter | 310/54 |
| 3,626,079 | 12/1971 | Keen, Jr. et al. | 174/15 BH |

*Primary Examiner*—Laramie E. Askin
*Attorney, Agent, or Firm*—F. J. Baehr, Jr.

[57] ABSTRACT

A stud for a terminal bushing is cooled by a liquid flowing through a spiral groove formed in a juncture of telescoping tubular members utilized to form the conducting stud of the terminal bushing.

3 Claims, 2 Drawing Figures

LIQUID-COOLED STUD FOR TERMINAL BUSHINGS OF A GENERATOR

BACKGROUND OF THE INVENTION

This invention relates to studs for terminal bushings of a generator and more particularly, to water-cooled studs.

Terminal bushing studs utilized in generators carry a large amount of current and even though the resistance is low, the energy loss is substantial and in the form of heat energy so that it is desirable to cool the stud by passing a cooling fluid therethrough. The cooling passages must be sealed to prevent leakage, easily drained to prevent freezing when the generator is shut down and they should be simple and easily manufactured.

SUMMARY OF THE INVENTION

In general a terminal bushing stud for a generator, when made in accordance with this invention, comprises an inner tubular member having end caps fastened thereto to form a compartment therein, an outer tubular member tightly embracing the inner tubular member to form contiguous surfaces and a spiral groove disposed in one of the contiguous surfaces so as to terminate adjacent opposite ends of the contiguous surfaces. The stud also comprises an inlet disposed in fluid communication with the spiral groove, an outlet disposed in fluid communication with the compartment within the tubular member and a conduit for providing fluid communication between the spiral groove and the compartment within the inner tubular member, whereby a coolant fluid may be circulated through the stud to remove heat therefrom.

BRIEF DESCRITPION OF THE DRAWINGS

The objects and advantages of this invention will become more apparent from reading the following detailed description in connection with the accompanying drawings, in which:

FIG. 1 is a partial, sectional view of a terminal bushing for a generator showing the disposition of the stud therein; and FIG. 2 is a partial, sectional view of the stud.

DESCRIPTION OF THE PREFERRED EMBODIMENT

Figure 1:
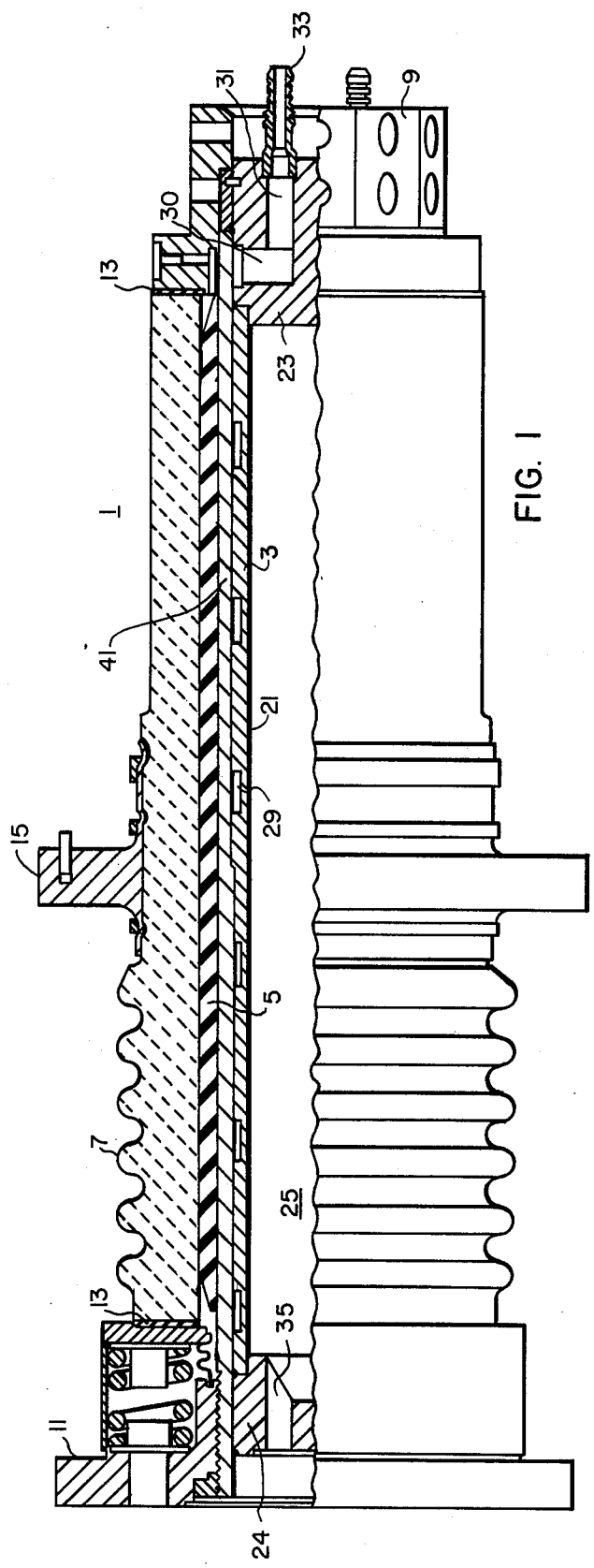

Referring now to the drawings in detail, and in particular to FIG. 1, there is shown a terminal bushing 1 for an electrical apparatus such as a generator. The terminal bushing 1 has a conductive stud 3 extending through the central portion thereof. The stud 3 is wrapped with an electrically insulating material 5 and slipped into a porcelain insulator 7. A polygon shaped lead cap 9 is brazed to one end of the stud 3 and a flanged spring loaded cap 11, which applies pressure to gaskets 13 disposed on opposite ends of the porcelain insulator 7, is screwed on the other end of the stud 3.

A metal flange 15 is disposed around the outer surface in the central portion of the porcelain insulator 7 and is securely fastened thereto and forms a seal therebetween. The flange 15 mounts on the generator affixing the terminal bushing 1 to the generator.

Figure 2:
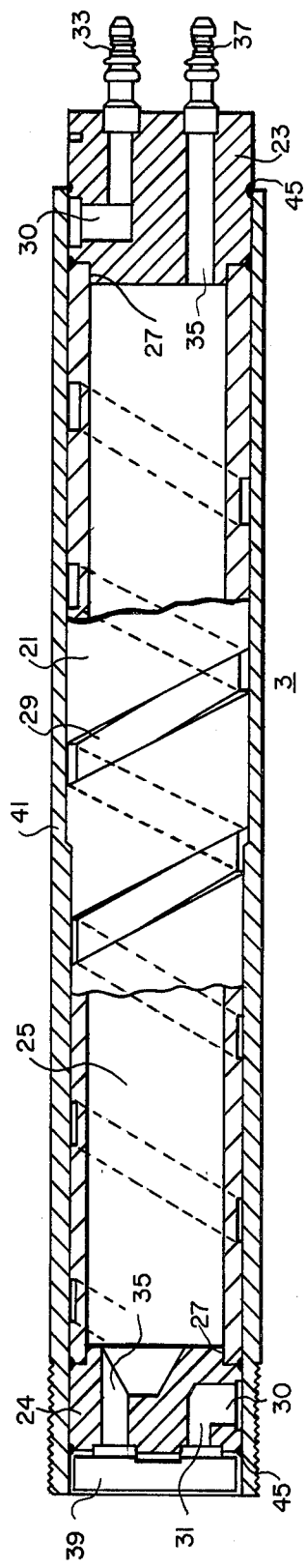

As shown in FIG. 2, the stud 3 comprises an inner tubular member or sleeve 21 having plugs or end caps 23 and 24 metallurgically bonded to each end to form a compartment 25 within the inner sleeve 21. The end caps 23 and 24 have an outer diameter generally equal to the outer diameter of the inner sleeve 21. A step 27 is provided in the end caps 23 and 24 so as to fit within the inner sleeve 21. A metallurgical joint is formed where the riser portion of the step 27 meets the end of the sleeve 21. The inner sleeve 21 has a spiral groove 29 disposed in the outer surface, the groove 29 extends into the end caps 23 and 24 and terminates inboard of the ends of the outer ends of the end caps 23 and 24.

A radial hole 30 extends inwardly into each end cap from the end of the spiral groove 29 and connects with a hole 31 disposed parallel to the longitudinal axis of the end caps 23 and 24 and inner sleeve 21. The hole 31 extends inwardly from the outer ends of the end caps 23 and 24. The hole 31 in one of the end caps 23 has a hose nipple 33 disposed therein forming inlet means by which cooling fluid may be supplied to the stud 3.

Holes 35 are disposed in the end caps 23 and 24 generally parallel to the longitudinal axis of the end caps and extend therethrough. The hole 35 in the end cap 23 has a hose nipple 37 forming outlet means through which cooling fluid is discharged from the compartment 25.

The holes 31 and 35 in the end cap 24 have a conduit 39 or other means joining them in fluid communication, whereby the groove 29 is in fluid communication with the compartment 25.

An outer tubular member or sleeve 41 tightly embraces the inner sleeve 21 producing contiguous surfaces. While the groove 29 is disposed in the inner sleeve 21, it is understood that it could also be formed in the contiguous surface in the outer sleeve 41.

A seal 45 is disposed on each end of the sleeves 21 and 41 to prevent coolant from escaping from between the sleeves.

Hoses (not shown) are provided to circulate cooling fluid through the stud 3 to remove heat during operation and the terminal bushing is so disposed in the generator that the hose nipples 33 and 37 extend upwardly. Water or cooling fluid may be drained through the end cap 24 by removal of the conduit 39 or by supplying pressurized air at the nipple 37 to purge the cooling fluid via the nipple 33 in order to reduce the possibility of rupture due to freezing of the coolant when the generator is out of service during the cold months.

What is claimed is:

1. A terminal bushing stud for an electrical apparatus, said stud comprising an inner tubular member of circular cross-section having end caps fastened thereto to form a compartment therein, the end caps having an outer surface which is generally the same diameter as the outer surface of the inner tubular member; an outer tubular member of circular cross-section tightly embracing the inner tubular member to form contiguous surfaces therebetween; a spiral groove disposed on the outer surface of the inner tubular member, extending into the end caps and terminating inboard of the outer ends of the end caps; inlet means disposed in fluid communication with the spiral groove, outlet means disposed in fluid communication with the compartment within the inner tubular member; and means for providing fluid communication between the spiral groove and the compartment within the inner tubular member; whereby a cooling fluid may be circulated through the stud to remove heat therefrom.

2. A terminal bushing stud for an electrical apparatus, said stud comprising an inner tubular member having end caps fastened thereto to form a compartment therein, an outer tubular member tightly embracing the inner tubular member to form contiguous surfaces therebetween, a spiral groove disposed in one of the contiguous surfaces so as to terminate adjacent opposite ends of the contiguous surfaces, inlet means disposed in fluid communication with the spiral groove, outlet means disposed in fluid communication with the compartment within the inner tubular member, and means for providing fluid communication between the spiral groove and the compartment within the inner tubular member, the inlet and outlet means being disposed in one of the end caps and the means for providing communication between the groove and the compartment within the inner tubular member being disposed in the other end cap, whereby a cooling fluid may be circulated through the stud to remove heat therefrom.

3. A terminal bushing stud as set forth in claim 2 and further comprising a fluid-tight seal between each end of the inner tubular member and the respective end of the outer tubular member.

* * * * *